US010248290B2

(12) United States Patent
Galfond et al.

(10) Patent No.: US 10,248,290 B2
(45) Date of Patent: Apr. 2, 2019

(54) FANTASY SPORTS SIMULATION GAME SYSTEM AND METHOD

(71) Applicants: Philip Galfond, Las Vegas, NV (US); Dan Quinn, Paso Robles, CA (US)

(72) Inventors: Philip Galfond, Las Vegas, NV (US); Dan Quinn, Paso Robles, CA (US)

( * ) Notice: Subject to any disclaimer, the term of this patent is extended or adjusted under 35 U.S.C. 154(b) by 0 days.

(21) Appl. No.: 15/621,196

(22) Filed: Jun. 13, 2017

(65) Prior Publication Data
US 2017/0357391 A1    Dec. 14, 2017

Related U.S. Application Data

(60) Provisional application No. 62/350,075, filed on Jun. 14, 2016.

(51) Int. Cl.
| | |
|---|---|
| A63F 9/00 | (2006.01) |
| G06F 3/0482 | (2013.01) |
| G07F 17/32 | (2006.01) |
| G06Q 50/34 | (2012.01) |

(52) U.S. Cl.
CPC .......... *G06F 3/0482* (2013.01); *G06Q 50/34* (2013.01); *G07F 17/3244* (2013.01); *G07F 17/3272* (2013.01); *G07F 17/3288* (2013.01)

(58) Field of Classification Search
None
See application file for complete search history.

(56) References Cited

U.S. PATENT DOCUMENTS

| | | |
|---|---|---|
| 5,860,862 A | 1/1999 | Junkin |
| 6,193,610 B1 | 2/2001 | Junkin |
| 7,351,150 B2 * | 4/2008 | Sanchez ................. A63F 13/12 463/40 |
| 9,056,253 B2 | 6/2015 | Thompson et al. |
| 9,138,652 B1 | 9/2015 | Thompson et al. |
| 2002/0107590 A1 | 8/2002 | Liegey |
| 2002/0115488 A1 | 8/2002 | Berry et al. |

(Continued)

OTHER PUBLICATIONS

Einolf, Karl W., "Turn Fantasy Into Reality: Using Fantasy Football in an Economics of Sports Course," presented at Teaching Economics: Instruction and Classroom Based Research, Pittsburgh, PA, Feb. 2001, 11 pages.

(Continued)

*Primary Examiner* — Seng Heng Lim

(74) *Attorney, Agent, or Firm* — Davis Wright Tremaine LLP

(57) ABSTRACT

The disclosure includes a method comprising generating a plurality of contests by receiving game day lineup selections associated with respective user accounts; generating a plurality of game day sports contests by matching a plurality of pairs of user accounts; and sending game day matching notifications to the respective matched pairs of user accounts. The method further includes receiving a game day ticket price selection from the matched pairs of user accounts; receiving final game day statistics including final statistics associated with real-life sporting events that occurred on the game day; and determining a winner and a loser of the game day sports contests associated with the matched pairs of user accounts based at least in part on the final statistics and game day lineup selections associated with the matched pairs of user accounts.

19 Claims, 8 Drawing Sheets

(56) References Cited

U.S. PATENT DOCUMENTS

| | | |
|---|---|---|
| 2006/0046807 A1* | 3/2006 | Sanchez .................. A63F 13/12 463/9 |
| 2006/0205483 A1 | 9/2006 | Meyer et al. |
| 2007/0232393 A1 | 10/2007 | Dreyer |
| 2010/0137057 A1 | 6/2010 | Fleming |
| 2010/0184495 A1 | 7/2010 | Levy et al. |
| 2010/0203936 A1 | 8/2010 | Levy et al. |
| 2012/0220375 A1 | 8/2012 | Williams |
| 2014/0309023 A1 | 10/2014 | Suyat et al. |
| 2015/0057074 A1 | 2/2015 | Geller et al. |
| 2015/0209679 A1 | 7/2015 | Givant |
| 2016/0271501 A1 | 9/2016 | Balsbaugh |
| 2016/0320951 A1* | 11/2016 | Ernst .................... G06F 3/04842 |
| 2017/0128840 A1* | 5/2017 | Croci ..................... A63F 13/828 3/828 |
| 2018/0071637 A1 | 3/2018 | Baazov et al. |

OTHER PUBLICATIONS

Plautz, Jason, "How One Economist Created the Most Realistic Fantasy Football League Ever," The Atlantic, Sep. 5, 2012, 6 pages.
Redman, Joel R. "Tour," EconFantasy.com [retrieved on Jun. 12, 2017] Retrieved from the Internet: http://www.econfantasy.com/tour.asp.

* cited by examiner

Fig. 7a

MLB Scoring System (Hitters)

| | | MLB Scoring System (Pitchers) | |
|---|---|---|---|
| Walk | 2 | Strikeout | 1 |
| HBP | 2 | Hit/Walk/HBP | -0.25 |
| Single | 2 | Earned Run | -1 |
| Double | 4 | Win | 2 |
| Triple | 6 | Inning Pitched | 1 |
| Home Run | 8 | | |
| Stolen Base | 2 | | |

Fig. 7b

Baseball: Individual Athlete Modifiers

| Item | Boosts |
|---|---|
| Bat | Single, Double, Triple, Home Run |
| Cleats | Stolen Base, Single, Double, Triple |
| Contacts | Walk, Single, Double, Triple, Home Run |

Fig. 7c

| Bat | Material | Weight | Durability | Modifiers |
|---|---|---|---|---|
| Standard Issue | Yellow Birch | Balanced | N/A | None |
| Bat Name 2 | White Ash | Balanced | 2/5 | +1S |
| Bat Name 3 | Rock Maple | Barrel | 2/5 | +1HR |
| Bat Name 4 | Bamboo | Balanced | 3/5 | +1S, +2D |
| Bat Name 5 | Composite Wood | Barrel | 3/5 | +2HR |
| Bat Name 6 | Aluminum | Balanced | 4/5 | +1S, +2D, +3T |
| Bat Name 7 | Titanium | Barrel | 4/5 | +3HR |
| Bat Name 8 | Carbon | Balanced | 5/5 | +2S, +4D, +6T, -2HR |
| The Battle Axe | Kevlar | Barrel | 5/5 | -1S, +2D, +2T, +5HR |

Baseball: Global Athlete Modifiers

| Item | Boosts |
|---|---|
| Gym (Level 1-5) | Double, Triple, Home Run |
| Running Track | Stolen Base, Single, Double, Triple |
| Batting Cage | Walk, Single |
| Sports Science Institute | Walk, Single, Double, Triple, Home Run, Stolen Base |

*Fig. 8a*

Venue Upgrades

| Item | Boosts |
|---|---|
| Athlete Statue | Fan loyalty (attendance does not dip as much following a loss) |
| Halftime Show (1-5) | Ticket demand (specifically family ticket demand) |
| Luxury Boxes (1-5) | Ticket demand (specifically wealthier demographic) |
| Valet Service | Ticket demand (specifically wealthier demographic) |
| Concessions (1-5) | General ticket demand |

*Fig. 8b*

FANTASY SPORTS SIMULATION GAME SYSTEM AND METHOD

CROSS-REFERENCE TO RELATED APPLICATIONS

This application is a non-provisional of and claims the benefit of U.S. Provisional Application No. 62/350,075, filed Jun. 14, 2016, which application is hereby incorporated herein by reference in its entirety and for all purposes. This application is also related to U.S. Provisional Application No. 62/351,497, filed Jun. 17, 2016, which application is hereby incorporated herein by reference in its entirety and for all purposes.

BACKGROUND

In conventional fantasy sports games, game users compete against others by building a team of professional athletes from a particular league or competition while remaining under a salary cap, and earn points based on the actual statistical performance of the athletes in real-world competitions. Daily fantasy sports are an accelerated variant of traditional fantasy sports that are conducted over short-term periods, such as a week or single day of competition, as opposed to those that are played across an entire season. Daily fantasy sports are typically structured in the form of paid competitions typically referred to as a "contest" where winners receive a share of a pre-determined pot funded by their entry fees. A portion of entry fee payments go to the provider as rake revenue.

Simulation video games include a diverse super-category of video games, generally designed to simulate aspects of a real or fictional reality. For example, various simulation games attempt to copy activities from real life in the form of a game for various purposes such as training, analysis, prediction or pure entertainment. Such games often allow users to make a variety of choices and goals of the game may or may not be well defined.

Fantasy sports and simulation video games are both popular, but no conventional gaming systems provide users with a game that suitably provides both forms of entertainment. In view of the foregoing, a need exists for an improved fantasy sports gaming system and method in an effort to overcome the aforementioned obstacles and deficiencies of conventional video games and fantasy sports systems.

BRIEF DESCRIPTION OF THE DRAWINGS

FIG. 7a illustrates an example scoring system in accordance with an embodiment.

FIGS. 7b and 7c illustrate example athlete modifiers in accordance with one embodiment.

FIG. 8a illustrates example global athlete modifiers in accordance with one embodiment.

FIG. 8b illustrates example venue upgrades in accordance with one embodiment.

Figure 1:
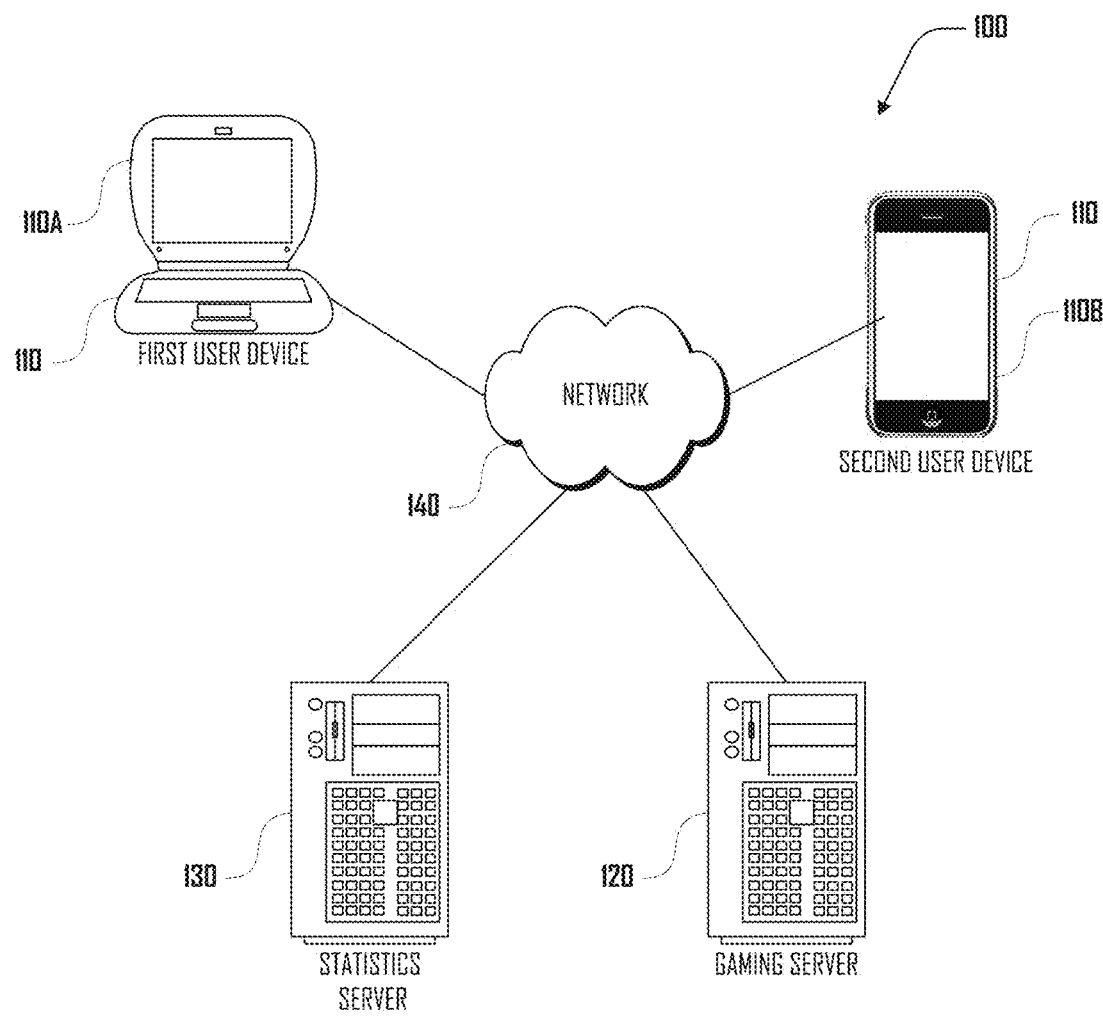
FIG. 1 is an example diagram illustrating an embodiment of a fantasy sports gaming system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Various embodiments disclosed herein relate to a mobile/web based sports franchise simulation social network game. In some embodiments, the game can be free to play with monetization occurring through in app currency purchases, which can be used to upgrade a user's team and/or sports facilities. In some various embodiments, users own and operate fictional baseball, football, basketball and/or hockey teams made up of actual professional athletes from the four major sports leagues. Users' teams can compete against one another each day in contests with a structure similar to head-to-head daily fantasy sports contests with all games hosted in the users' virtual home stadiums.

Turning to FIG. 1, a fantasy sports gaming system 100 is shown as comprising a first and second user device 110, a gaming server 120 and a statistics server 130, which are operably connected via a network 140. Although the user devices 110A, 110B are shown as being a laptop computer and smartphone respectively, in further embodiments any suitable device can serve as a user device 110 including a desktop computer, laptop computer, smart phone, tablet computer, gaming device, wearable computer, home automation system, vehicle computer, and the like. Additionally, in various embodiments, there can be any suitable plurality of user devices 110.

The gaming and statistics servers 120, 130 can comprise any suitable server device, which can include one or more physical server, cloud computing service, or the like. In various embodiments, the gaming and statistics servers 120, 130 are separate servers operated by separate entities, but in some embodiments the gaming and statistics servers 120, 130 can be the same server. The network 140 can comprise any suitable wired and/or wireless network including the Internet, a cellular network, a WiFi network, a Local Area Network (LAN), a Wide Area Network (WAN), a Bluetooth network, and the like.

Although the example gaming system 100 of FIG. 1 illustrates only a first and second user device, in various embodiments, the gaming system 100 can comprise a large plurality of user devices 110, which can respectively be associated with one or more user accounts for a gaming service, which in one preferred embodiment can comprise a daily fantasy sports gaming service. A user can sign into a user account on a user device 110, which can allow the user to play fantasy sports games as discussed herein. The user device 110 can be configured for the user to provide payments, receive payments and the like, which can be done via a bank account, cryptographic currency, credit card, debit account, or the like. Accordingly, a gaming system 100 of further embodiments can allow a plurality of users to play fantasy sports games together via a set of user devices 110 where such fantasy sports games are moderated or facilitated by the gaming server 120. Such fantasy sports games can include any suitable sport, including baseball, basketball, football, soccer, hockey and the like.

In one example, the gaming system 100 can be configured to facilitate a fantasy sports game where a user owns a sports stadium that hosts various sporting events. The stadium owner user can buy fantasy athletes and field a team for various sports and compete against other users. In various examples, the stadium owner can make virtual money during gameplay by selling virtual tickets to the stadium and through concessions, television contracts and advertising just like a real stadium or team owner would.

In various embodiments, the game initially provides a new stadium owner with a limited amount of game money that only allows the stadium owner to afford minimal stadium amenities and only athletes with low skill and popularity. However, as the virtual stadium makes more virtual money by winning games, attracting more fans, creating a demand for higher stadium ticket prices, and attracting more lucrative stadium sponsors, the stadium owner can acquire enough virtual money to afford stadium upgrades, higher quality athletes, and higher quality team equipment, which in turn generates more virtual revenue for the stadium owner and provides for further upgrades.

When competing against another user or virtual team within the game, the winner and loser of a given sporting event can be determined based on the real-life statistics and performance of real-life athletes that play on real-life sports teams. For example, in one embodiment, a virtual sporting event can include a first and second user selecting athletes for a virtual sporting event within the game on a given day and the winner and loser of this virtual sporting event can be based on the performance of real-life athletes in one or more real-life sporting events during that same day corresponding to the virtual teams selected by the first and second user.

Accordingly, by strategically selecting athletes for virtual sporting events, by appropriately upgrading the virtual stadium and athlete equipment, and by charging the ideal price for virtual tickets to the stadium, the game user can grow his virtual stadium from a small venue that only fields a single team, to a large and luxurious stadium that hosts virtual events for many types of sports and has contracts with the top athletes in each given sport. In other words, in various embodiments, the gaming system 100 allows users to role play as a fantasy stadium owner where outcomes are determined based on both user choices and the actions and statistics of real-life athletes on real-life sports teams.

The following disclosure relates to one example embodiment for purposes of illustration only and should not be construed to be limiting on the wide variety of variations that are contemplated and are within the scope and spirit of the present invention. For example, although various examples herein relate to the sport of baseball, further embodiments can relate to any other suitable sport and can be configured for a plurality of sports or other events.

Figure 2:
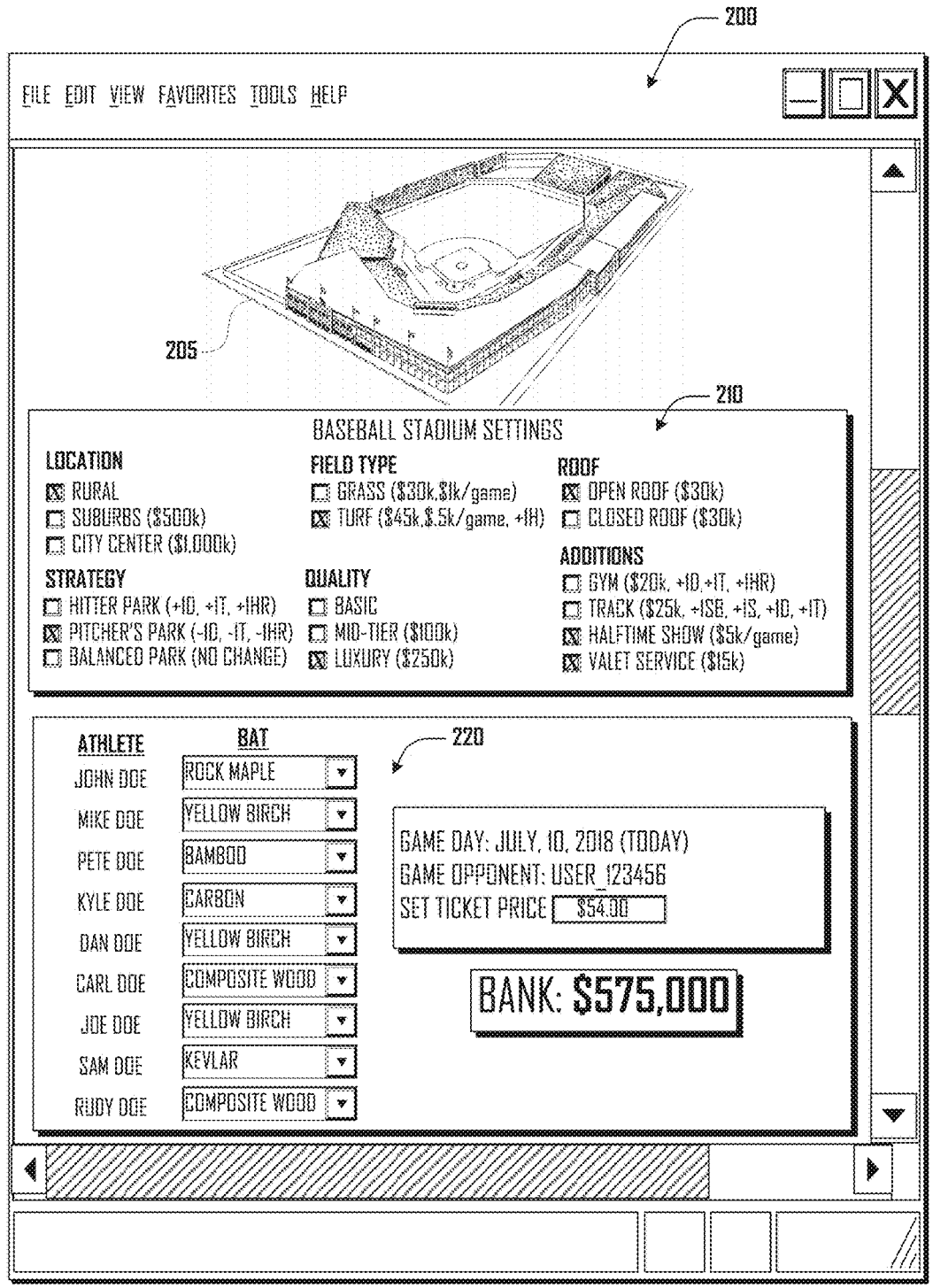
FIG. 2 is an illustration of an example game interface that includes an image of a virtual stadium, a stadium setting interface box and a sporting event setting interface box.

Turning to FIG. 2, an example game interface 200 is illustrated which comprises an image of a virtual stadium 205, a stadium setting interface box 210 and a sporting event setting interface box 220. In various embodiments, the virtual stadium image 205 can be configured to change to illustrate upgrades that the user makes to the virtual stadium, virtual sporting events, and the like. As discussed in more detail herein, the boxes 210, 220 can allow a user to upgrade, modify, edit or change a virtual stadium, team roster, team equipment and the like.

Such an interface 200 can be presented on any suitable type of user device 110 in various suitable forms, including within an Internet browser, as an application or "app," as a software program, as part of a computer operating system, or the like. Moreover, this specific example of an interface 200 is only used for purposes of illustration and should not be construed to be limiting.

Figure 3:
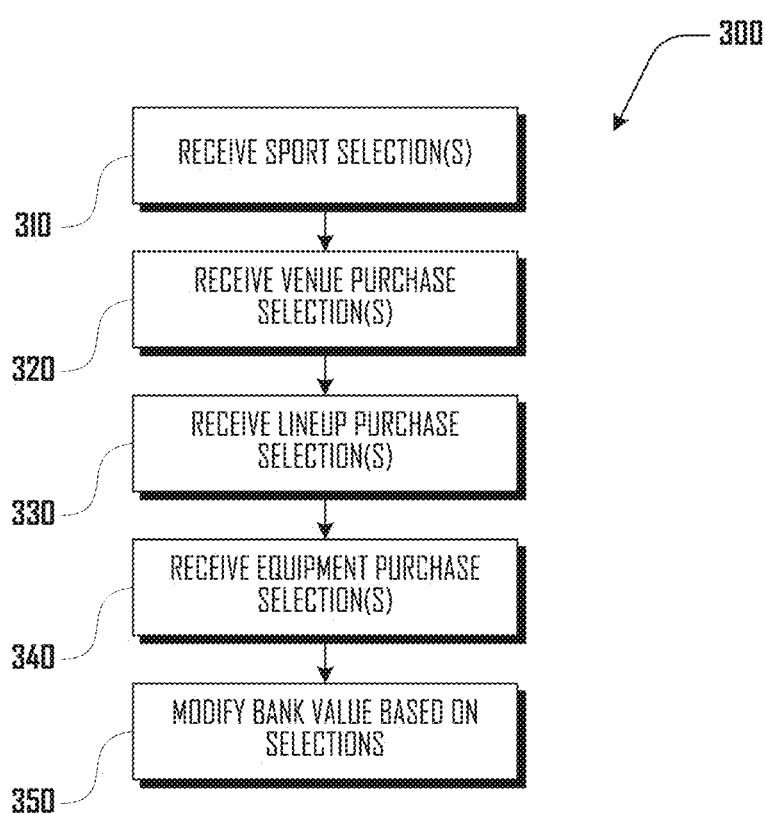
FIG. 3 is an example flow chart illustrating an embodiment of a method of initializing a fantasy sports game.

Turning to FIG. 3, a method 300 of initializing the game is illustrated, which begins in block 310, where a sport selection is received. Venue, lineup and equipment purchase selections are respectively received in blocks 320, 330 and 340 and in block 350 a bank value is modified based on the selections. In various embodiments, the method 300 can be performed by the gaming server 120 (FIG. 1) with communications being received from one or more user device 110.

For example, in one embodiment, new users begin with $1,000,000 of virtual money in the bank and use this to build a stadium, buy athletes and equipment for the athletes. In various embodiments, the starting user is limited to selecting one or more sports that are currently in season in real-life where virtual sporting events hosted at the virtual stadium are based on actions and statistics of real-life athletes and/or teams. In other words, where gameplay is influenced by real-life sports statistics and events, gameplay can be limited based on the seasonal availability of such real-life sports statistics and events. For example, during the summer months, baseball may be one of the only available sports to select because it is one of the only sports being played during this time.

After choosing at least one sport, the user can build a stadium. The user can choose from a multitude of options when initially building a stadium, which may or may not include a price in virtual game money. In various embodiments, some initial stadium selections may be permanent or irreversible, while some initial stadium selections can be modified, reversed, upgraded, downgraded, or the like. In some embodiments, all initial stadium selections are permanent or irreversible, whereas in other embodiments, all initial stadium selections can be modified, reversed, upgraded, downgraded, or the like.

Some examples of stadium selections are illustrated in FIG. 2 and discussed below, but again, should not be construed to be limiting. Type: Open stadiums can drive higher ticket demand in sunny weather. Domed stadiums feature no weather related ticket demand impacts and the potential to house indoor sports in same stadium. Quality: Available in basic, mid-tier, and luxury formats in some embodiments with higher levels offering greater seating and the ability to charge higher ticket prices for each class of seats. Location: Building a stadium in the city center allows the game user to charge higher ticket prices and access a larger population of fans than the suburbs.

Field Type: Installing a turf field costs more upfront than natural grass but can require less cost to maintain. Hitters at a turf park (hosting athletes and your opponent athletes) can also receive a 1 point boost to singles due to the increased speed at which ground balls travel. Park Type: building a "pitchers park" reduces scoring for doubles, triples, and home runs by 1 each, whereas a "hitters park" will have the opposite impact. A "balanced park" has no impact on athletes' stat scoring in some embodiments. Other examples of upgrades, changes, or additions to a stadium are discussed herein.

Building a team and/or selecting a team lineup can be done in various suitable ways. For example, using baseball as an example, all current MLB athletes can be eligible to be chosen for a team, with each athlete given a virtual salary by the game's engine with the better athletes commanding higher salaries. The stadium owner can purchase virtual "contracts" with athletes and such contracts can be of varying lengths. For example, a contract length can be for a day, week, month, season, or the like. In some embodiments, longer-term contracts can provide a better per game average and one-game contracts can provide the worst value.

Virtual athlete salaries or contract prices can be determined in various suitable ways. For example, in one embodiment, an athlete salary can be determined based on the athlete's current, projected and/or historical statistics, awards, team association, sponsors, real-life athlete salary, and the like. Additionally, in further embodiments, an athlete salary can be market driven. For example, in some embodiments, users can trade, sell, buy or otherwise exchange virtual athletes or athlete contracts and such exchanging can be used to determine a price for an athlete salary or contract.

In some examples, stadium owners may or may not be limited in their ability to select players for a roster for a given game. For example, in some embodiments, stadium owners can be required to draft entirely new teams each time they want to host a game. In other words, no players can remain on their roster for more than one game. In further embodiments, stadium owners can be limited in their ability to select players for a roster for any desirable time period and for various numbers of players for a given roster, which may or may not include active players for a given game.

For example, where a baseball roster includes 9 active athletes for each game and 16 bench athletes (for a total of 25 roster slots), a stadium owner may be required to select a completely different set of 9 active players compared to the last game (or the last two, three, four, five games, or the like) where no players are the same between sets. Alternatively, the stadium owner may only be allowed to retain a portion of an active roster, but be required to replace a portion of a roster in a subsequent game.

In other embodiments, stadium owners can maintain a roster of players for as long as they want or for a current season with rosters resetting each season. For example, in some embodiments, a stadium owner can purchase or otherwise acquire a player as a rookie and hold him as he develops into a star in his 4th season, purchasing equipment upgrades for him along the way. Accordingly, in various embodiments, a system can receive prospective roster selections from a user and determine whether the roster selections are valid based on various suitable roster rules, including the roster rules discussed herein.

In various examples, and as discussed above, a baseball roster can include 9 active athletes for each game and 16 bench athletes for a total of 25 roster slots. In other words, in some embodiments, a virtual stadium owner can have contracts with up to 25 athletes at a time, and for a given sporting event that is hosted at the virtual stadium, the stadium owner can select 9 athletes of the 25 to "play" in the game as discussed in more detail herein. Additionally, when initially setting up a stadium and a team, and at any point in the game, the stadium owner can also purchase equipment for the team. Using the baseball example, such equipment can include bats, shoes, gloves, eyewear, and the like, which as discussed in more detail herein, can improve and/or reduce scoring for one or more athletes that the equipment is associated with.

In various examples, sport, stadium, team and equipment selections can be associated with a virtual money cost and the cost of any such selections can be deducted from the virtual money available to the stadium owner or that the stadium owner has in the "bank."

As discussed herein, stadium owners can host a virtual sporting event at their stadium and field a virtual team of athletes for the virtual sporting event against one or more team of athletes fielded by one or more opposing stadium owner. Such a virtual sporting event can be a daily fantasy sports event where the real-life statistics and actions of fielded athletes determines which team of the virtual sporting event wins or loses. Although some embodiments relate to a daily fantasy sports event, further embodiments can include a fantasy sports event associated with any suitable time period including an hour, six hours, one week, a game series, a game inning, a game half, a sports season, or the like.

Using the example of a head-to-head daily fantasy baseball game (i.e., only two virtual baseball teams competing), users can choose to participate for a given day where one or more real-life sporting events are occurring during that day. A stadium owner can configure a team to "play" during that day and the statistics and actions of the athletes or teams that occur in real-life during that day will impact the outcome for the virtual team that has been configured.

In various embodiments, a virtual team configured by a stadium owner can include athletes from one or more teams and associated with one or more real-life games that are occurring during the day. In other words, although real-life athletes play for one team and many games are occurring simultaneously during a day, a virtual sporting event may not be constrained by team affiliation or the specific event in which athletes are participating. For example, in some embodiments, a virtual team can comprise athletes that are playing each other on opposing teams in real-life on a given day, and/or can comprise athletes that are playing in separate real-life games in different cities during a given day.

Figure 4:
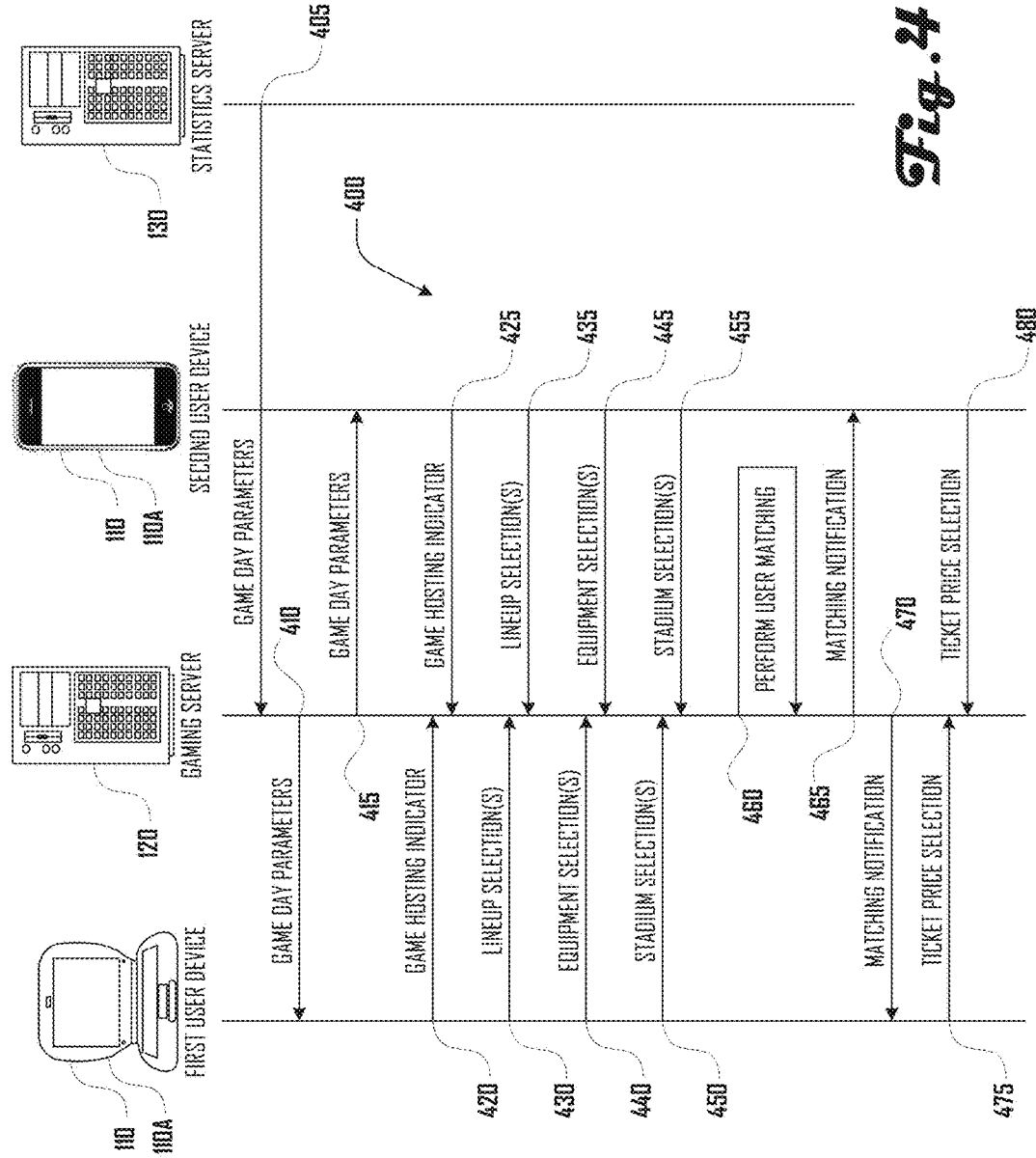
FIG. 4 is a data flow diagram that illustrates a series of communications that can occur when a first and second user device communicate with a gaming server to setup a daily fantasy sports game.

Turning to FIG. 4, a series of communications 400 are illustrated wherein a first and second user device 110A, 110B communicate with a gaming server 120 to setup a daily fantasy sports game. The communications begin where a statistics server 130 sends 405 game day parameters to the gaming server 120, which sends 410, 415 game day parameters to the first and second user device 110A, 110B. In various embodiments, game day parameters can include any suitable parameters related to real-life sporting events that are occurring on a given day or within a certain time period, including teams that are playing, current team statistics, team roster for a season, team roster for a game, a list of eligible athletes for a game, athlete injury status, athletes eligible to play in a game, time(s)/place(s) that one or more games are occurring, weather conditions of where a game is being played, field conditions of where a game is being played, umpires/referees that will be calling a game, and the like.

In some embodiments, such information can be presented on a user device 110 for informational purposes (e.g., via an interface 200 illustrated in FIG. 2). Additionally, in various embodiments, such real-life game day parameters can affect the options that a user has when configuring a virtual team of athletes for a daily fantasy sports event. For example, in some embodiments, a user can be limited to selecting athletes from teams that are playing that day, limited to selecting athletes that are eligible to play that day, and the like. In various embodiments, the statistics server 130 can be associated with an entity that tracks and publicizes sports statistics and information for one or more sport.

For example, such a statistics server 130 can be associated with a company such as the Entertainment and Sports Programming Network (ESPN) or a sporting association such as the National Football League (NFL), the National Basketball Association (NBA), Major League Baseball (MLB), National Hockey League (NHL), Major League Soccer (MLS), Fédération Internationale de Football Association (FIFA), Stats LLC, Sportsradar AG, or the like. Accordingly, in further embodiments, there can be any suitable plurality of statistics servers 130 that provide data to the gaming server 120.

Returning to the communications 400, a game hosting indicator is sent 420, 425 to the gaming server from the first and second user device 110A, 110B respectively. The first user device 110A also sends 430, 440, 450 lineup selections, equipment selections, and stadium selections to the gaming server 120. The second user device 110B also sends 435, 445, 455 lineup selections, equipment selections, and stadium selections to the gaming server 120.

For example, as discussed herein, a user can choose to participate in or not participate in various fantasy sports events. In the example of daily fantasy sports, users can choose to participate on some days and not others if desired. Where the user elects to participate in the day's event, the user can select athletes for a virtual team, select a configuration for their hosting stadium, and the like.

In the examples discussed herein, game users always host events at their stadium even though they are playing an opposing team associated with another stadium owner. For example, as discussed in more detail herein, where a first and second virtual team is matched with the first and second virtual team associated with a respective first and second stadium owner, parallel and separate virtual games are played by the matched virtual teams in both of the virtual stadiums of the first and second stadium owners. In other words, in some embodiments, all stadium owners only virtually participate in home games at their stadium and never participate in away games hosted at another game user's stadium. However, in further embodiments, away games can be played at another game user's stadium.

Returning to the communications 400, game user matching is performed 460 at the gaming server 120, where a first and second user are matched and a matching notification is sent 465, 470 to the first and second user device 110A, 110B respectively. Although the present set of communications 400 of FIG. 4 illustrates only a first and second user device 110A, 110B for purposes of clarity, further embodiments can include a large plurality of game users associated with one or more user device 110.

Accordingly, in various embodiments, game user matching can include matching a plurality of users. Such matching can be done in any suitable way, including matching of gaming users within a "league" of associated users, matching users randomly, matching users based on stadium configuration, matching users based on lineup selections, matching users based on user skill, and the like. Additionally, although the present example relates to pairing users for head-to-head fantasy sports games, in further embodiments any suitable plurality of users can be matched together for a game, or a user can be matched with a non-user team such as an automated team run by the gaming server 120, or the like.

Returning to the communications 400, stadium ticket price selections are sent 475, 480 to the gaming server 120 by the first and second user device 110A, 110B respectively.

As discussed herein in more detail, virtual ticket prices can be set by stadium owners based on a variety of factors, which can include the configuration of the opposing team that the user has been matched with. For example, a matching notification can include information about the opposing virtual team, including the team roster, equipment selections for athletes, athlete statistics, and the like.

Although the communications 400 of FIG. 4 are presented in one example order, this should not be construed to be limiting on the potential order for such communications 400 in further embodiments or that all such communications will be present in all embodiments. For example, in some embodiments one or more of lineup selections, equipment selections, and/or stadium selections can be made after a ticket price is selected. Additionally, in further embodiments, a ticket price can be selected before one or more of lineup selections, equipment selections, and/or stadium selections. Furthermore, in further embodiments, lineup selections, equipment selections, and stadium selections can be made in any suitable order or may not be made at all. For example, in some embodiments, a stadium owner may make no selections and a default or previously used configuration can be used.

Figure 5:
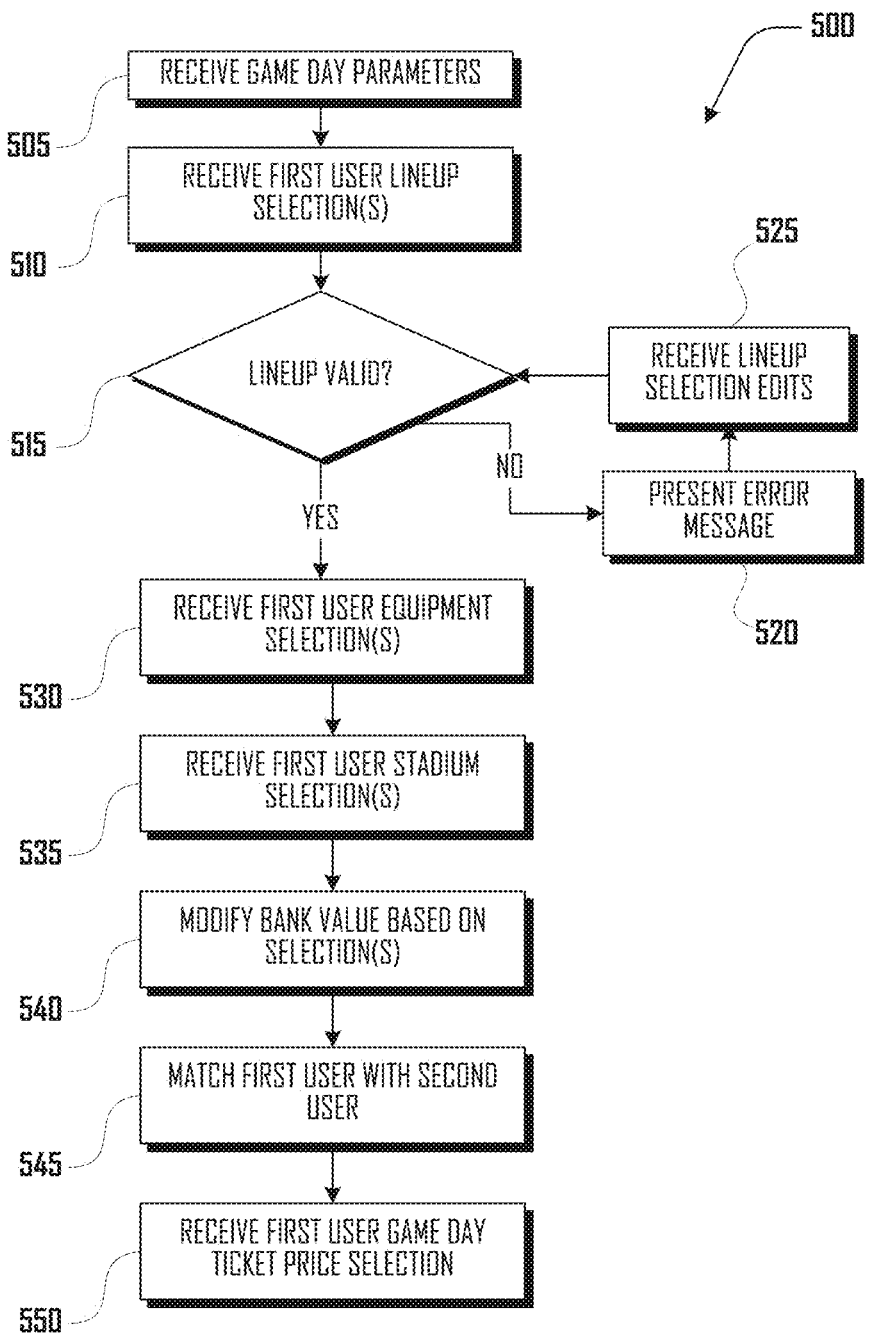
FIG. 5 is a block diagram that illustrates an example of a method of setting up a fantasy sports event.

FIG. 5 illustrates an example embodiment of a method 500 of setting up a fantasy sports event, which in some embodiments can be performed by a gaming server 120. The method 500 begins in block 505 where game day parameters are received, and in block 510, a first stadium owner user's lineup selections are received. In decision block 515, a determination is made whether the lineup is valid, and if not, the method 500 continues to block 520, where an error message is presented. In block 525 lineup selection edits are received and the method 500 cycles back to block 515, where a determination is made whether the lineup selections are valid.

For example, using baseball as an example, in some embodiments, a stadium owner must have enough virtual athletes competing in actual MLB games that evening to field a nine-person fantasy roster. If they do not, they can chose to not play a game that evening or they can make roster moves (e.g., signing an athlete to a one day contract) to correct the issue.

If the stadium owner has a valid athlete lineup, then in block 530, an equipment selection is received. As discussed herein, various suitable equipment selections can be made, which may or may not modify attributes of one or more athletes of a virtual sports team such as the number of points scored for each scoring category. For example, in some embodiments related to baseball, equipment can include bats, cleats, eyewear and the like. Various examples of baseball equipment and associated attributes and/or modifiers are illustrated in FIGS. 2, 7b and 7c.

Referring to FIGS. 7b and 7c, in one specific example, a user can outfit his first baseman with the same Yellow Birch bat that every athlete starts with, or he can purchase from a long list of special bats that alter the number of points that athlete receives for each point category. For example, if a user is starting Bryce Harper and he hits a home run while the user has outfitted him with The Battle Axe, Harper will score 15 points for the home run instead of the normal 10. If the user chose to build a hitter's park as discussed herein in the stadium choosing stage, the home run would be worth 16 points after the one point hitters park HR bonus is also applied.

In some embodiments, equipment can be applied to one athlete only and cannot be shared amongst athletes, whereas in further embodiments, equipment can be applied to more than one athlete and/or shared amongst athletes. Virtual athlete equipment can have static attributes or changing attributes. For example, baseball bats can have various aging states including new, minimal wear, game tested, well worn, battle scarred, and the like. In another example, bats can age in different ways such as wood bats that maintain their attributes until they break; metal bats gradually lose their attributes but never break; composite bats gradually improve as you use them more, then break, and the like. In further embodiments, such equipment can be traded and/or purchased on a digital marketplace which may be operated by the gaming server 120.

Returning to the method 500 of FIG. 5, in block 535, stadium selections for the first stadium owner user are received and, in block 540, virtual currency bank values for the first stadium owner user are modified based on stadium, equipment and/or lineup selections. In various embodiments, stadium selections can modify athlete attributes and/or stadium revenue attributes, or the like. Examples of baseball stadium selections or upgrades and related athlete attributes modifications are illustrated in FIG. 8*a*. Examples of baseball stadium selections or upgrades and related stadium revenue, ticket demand, and the like are illustrated in FIG. 8*b*.

In block 545, the first stadium owner user is matched with a second stadium owner user, and in block 550, a first stadium owner user ticket price selection is received. For example, where a stadium owner user knows the team or he will be playing, and can see their roster and win loss record, the stadium owner user can use this information, as well as a multitude of other factors to price his tickets for the game, with the goal to maximize ticket revenue.

In other words, once a stadium owner user's opponent for the day has been established he must set ticket pricing for the virtual game, which will directly impact demand for virtual tickets for the virtual game. Secondary drivers of ticket demand can include quality of opponent, weather, marketing spend, stadium quality, and the like. In some embodiments, the largest impact can come from recent performance of the hosting stadium owner's team.

For example, if it's a beautiful 72 degree day in the user's virtual city where his virtual stadium is located, his virtual baseball team has won 7 straight, he just installed new seating in the right field stands, and he has aggressively promoted today's virtual game versus another strong team, the user would be justified in attempting to charge a premium for tickets to today's virtual game. The exact figure selected can impact the amount of virtual revenue generated during the virtual game as charging too much will result in empty seats while charging too little will result in a sellout with ticket scalpers capturing the extra profit.

In various embodiments, where two users are suitably configured to play a fantasy sports game as discussed herein, the gameplay mechanics can operate like a conventional head-to-head points-based daily or season-long fantasy sports match-up.

For example, each virtual team can compile points from their nine active athletes according to a suitable scoring system (e.g., as illustrated in FIG. 7*a*), with the winner being the virtual team that records or earns the most fantasy points on the evening. At the end of the game the user can also receive financial results for the virtual game, and will be able to reassess the overall financial position of his sports team franchise and stadium. In various embodiments, users can earn revenue from virtual ticket sales, virtual concessions, virtual licensed goods, and the like.

In further embodiments, users can fine tune, modify or otherwise configure variables related to such virtual revenue sources for future games. In some embodiments, virtual revenue sources such as TV deals, in-stadium advertising, and the like, can become available to the user as they continue to progress through the game.

In various embodiments, as users win more games and earn more virtual revenue as a result, they may be able to afford better athletes, which allows users to compete against higher quality opponents, which in turn can allow them to charge more for their virtual tickets and other revenue sources. Gameplay can continue until a user is running virtual sports teams in each of the four major sports comprised of the best athletes in each sport and competing daily against other users of a similar level.

In various embodiments, users can gauge their progress against that of other users via a Franchise Value, which can be comprised of various suitable components including the number of teams owned by the user; cumulative win/loss record of all teams owned; annual income and total assets (physical and cash); fan loyalty/awareness/interest levels, and the like. In some embodiments, game user matching for virtual sporting games can be based at least in part on such a Franchise Value.

Figure 6:
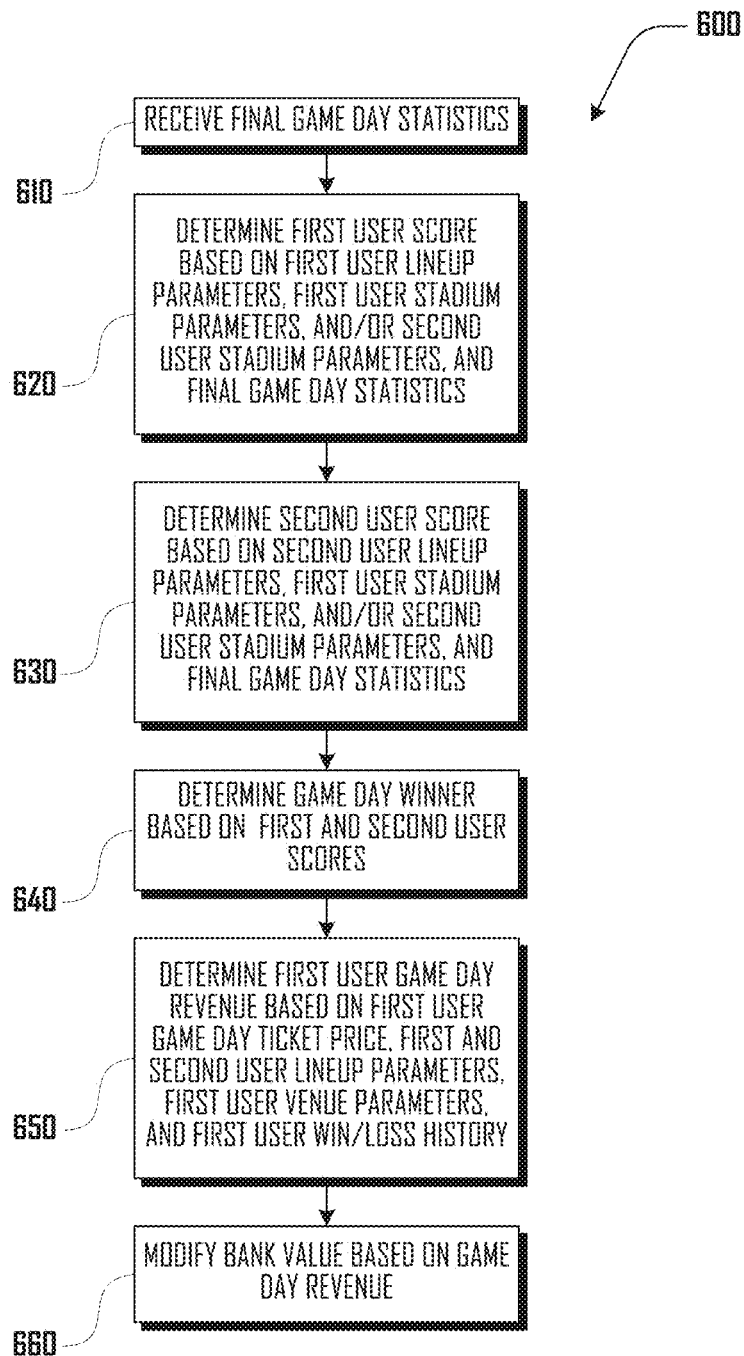
FIG. 6 is a block diagram that illustrates an example method of determining a winner of a fantasy sports matchup between a first and second game user and determining stadium revenue from the fantasy sports matchup.

FIG. 6 illustrates an example method 600 of determining a winner of a fantasy sports matchup between a first and second game user and determining stadium revenue from the fantasy sports matchup for the first game user, which in some embodiments can be performed by the gaming server 120. The method 600 begins in block 610 where final game day statistics are received (e.g., from the statistics server 130). For example, where a daily fantasy sports matchup relates to sports games being played in real-life, when these games are over and the statistics are available, such statistics can then be used to determine the winner of the fantasy sports matchup.

In block 620, a first game user score is determined based on first game user lineup parameters, first game user stadium parameters, and final game day statistics. Using the baseball example as discussed herein as an illustration, the game day statistics associated with the nine baseball athletes selected by the first stadium owner can be used to determine a score using a scoring system such as the scoring system illustrated in FIG. 7*a*, and this scoring can be modified based on various athlete modifiers such as equipment associated with one or more athletes (e.g., as illustrated in FIGS. 7*b* and 7*c*) and also based on stadium parameters (e.g., as illustrated in FIG. 8*a*).

In block 630, a second game user score is determined based on second game user lineup parameters, first game user stadium parameters, and final game day statistics. Using the baseball example as discussed herein as an illustration, the game day statistics associated with the nine baseball athletes selected by the second stadium owner can be used to determine a score using a scoring system such as the scoring system illustrated in FIG. 7*a*. As discussed above this scoring can be modified based on various athlete modifiers such as equipment associated with one or more athlete (e.g., as illustrated in FIGS. 7*b* and 7*c*) and also based on the first user's stadium parameters (e.g., as illustrated in FIG. 8*a*).

Accordingly, in some embodiments, where the two teams are playing in the first game user's stadium, at least some parameters of the first game user's stadium can affect the second stadium owner's athletes (e.g., whether the stadium is hitters park, pitchers park, or the like). However, in further embodiments, parameters of the second stadium owner's stadium can be used to calculate a score for the second team. For example, where the second stadium has a virtual sports science program, a gym and a track, boosts related to these second stadium attributes can be used calculate the score for the second stadium owner in the head-to-head matchup.

In block 640, a game day winner is determined based on the determined first and second game user team scores. In some embodiments, such scores and/or winner can be determined in this manner for a first stadium owner perspective only where all users play from the perspective of hosting each game. In other words, the method 600 can be used to calculate a score from the first stadium owner's perspective because the first stadium owner is hosting the game with the "away team" of the second stadium owner being affected by the first stadium.

On the other hand, scores and winners from the second stadium owner's perspective can be calculated based on the second stadium owner hosting the game at the second stadium with the "away team" of the first stadium owner being affected by the first stadium. Accordingly, in various embodiments, scores and winners can be calculated differently from a first and second stadium owner's perspective, and in some embodiments, the winner and loser may be different for each perspective. In other words, in some embodiments, the first stadium owner may win from his perspective but lose from the perspective of the second stadium owner. However, in further embodiments, the outcomes for the first and second stadium owner perspective can be configured to be the same, even if in some embodiments scores of each perspective are calculated differently.

Accordingly, one novel aspects of gameplay for various embodiments is the flexible point system as discussed herein. In contrast to conventional fantasy sports offerings where a point system utilized for the sport is fixed for that season (e.g., a home run is worth 8 points, and it will be worth 8 points for the entire 2016 season), the base value of a home run for example may also be fixed (at 8 points as illustrated in the example of FIG. 7*a*) but it's value can differ depending on each specific user's athlete and/or field modifiers as discussed herein.

Returning to the method 600 of FIG. 6, in block 650, first user game day revenue can be determined based on first user game day ticket price, first and second user lineup parameters, first user venue parameters, and first user win/loss history. In block 660, the first user's bank value is modified based on determined game day revenue.

For example, as discussed herein, various factors can be used to determine virtual revenue from attendance, purchases and other revenue generated by hosting the virtual game at the first user's virtual stadium. One revenue source can include virtual ticket sales, which can be influenced by factors including win/loss record of the virtual team, team athletes, ticket price set by the stadium owner, amenities available at the virtual stadium, weather conditions associated with the virtual stadium, and the like. Additionally, further revenue sources, as discussed herein, can include virtual advertising or licensing revenue, which can also be influenced by similar factors.

For example, where a virtual stadium franchise has high-quality and popular athletes on its roster, and the virtual team has won several virtual fantasy games recently, such a team may be determined to attract more virtual fans to buy tickets to the games and may also be determined to justify the stadium owner to set a higher virtual ticket price due to higher demand. Similarly, amenities such as high-quality virtual concession, a half-time show, luxury box seats, and the like, may also be determined to attract more virtual fans and justify higher virtual ticket prices.

In further embodiments, users can generate virtual revenue in other suitable ways including during "off days," or days where no eligible real-life sports games are being played that day. For example, in one embodiment, stadium owners can be provided with the option of hosting events such as a concert, conference, or the like, during off days.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A system comprising:
a sports statistics server configured to store statistics associated with a plurality of sporting events and sports players;
a plurality of user devices respectively comprising one of a smartphone, tablet computer, laptop computer or desktop computer, with each of the user devices configured to:
receive real-life game day parameters, via a communication network, from a matching server that originated from the sports statistics server that is separate from the matching server, the real-life game day parameters comprising a set of athletes eligible to play one or more sporting event on a game day;
generate and send, via the communication network, a game day event hosting indication to the matching server indicating that a user account associated with the user device will host a virtual sporting event at a virtual stadium associated with the user account;
generate and send, via the communication network, game day lineup selections to the matching server, including a selection of a subset of the set of athletes eligible to play the one or more sporting event on the game day;
generate and send, via the communication network, game day equipment selections to the matching server, including a selection of virtual equipment for one or more athletes of the subset of the set of athletes eligible to play the one or more sporting events on the game day;
generate and send, via the communication network, game day stadium selections to the matching server including a selection associated with one or more aspects of the virtual stadium associated with the user account;
receive, via the communication network, a game day matching notification from the matching server indicating a game day matching with a competitor user account including an indication of lineup selections associated with the competitor user account;
generate and send, via the communication network, a game day ticket price selection to the matching server indicating a virtual ticket price being charged to virtual attendants at the virtual stadium during the game day virtual sporting event hosting; and
the matching server configured to communicate with the plurality of user devices via the communication network and configured to generate and run plurality of game day sports contests, the generating the plurality of sports contests comprising:

receiving, via the communication network, game day event hosting indicators, game day lineup selections, game day equipment selections and game day stadium selections associated with respective user accounts from the plurality of user devices and defining a set of game day user accounts;

generating a plurality of game day sports contests by matching a plurality of pairs of user accounts from the set of game day user accounts;

generating and sending, via the communication network, game day matching notifications to user devices associated with the respective matched pairs of user accounts, the matching notifications indicating a game day matching with a competitor user account including an indication of game day lineup selections associated with the competitor user account;

receiving, via the communication network, a game day ticket price selection from at least a portion of the user devices associated with the matched pairs of user accounts;

receiving final game day statistics, via the communication network, from the sports statistics server, including final statistics associated with real-life sporting events that occurred on the game day;

determining, for at least a portion of the matched pairs of user accounts, a winner and a loser of the game day sports contests associated with the matched pairs of user accounts, the determining based at least in part on the final statistics associated with real-life sporting events that occurred on the game day and lineup selections associated with the matched pairs of user accounts; and determining game day virtual stadium revenue associated with virtual stadiums of at least a portion of the matched pairs of user accounts, the determining based at least in part on a ticket price selection and lineup selections associated with a user account.

2. The system of claim 1, wherein the determining a winner and a loser of the game day sports contests associated with the matched pairs of user accounts is further based on stadium selections and equipment selections associated with the matched pairs of user accounts.

3. The system of claim 1, wherein the determining game day virtual stadium revenue is further based on stadium selections and a win/loss record of a user account.

4. The system of claim 1, wherein the matching server is further configured to modify a bank value associated with respective user accounts corresponding to determined game day virtual stadium revenue.

5. The system of claim 1, wherein the matching server is further configured to modify a bank value associated with respective user accounts corresponding to received lineup selections.

6. The system of claim 1, wherein the matching server is further configured to determine that a lineup selection received from a first user device is invalid and send a lineup selection error message to the first user device.

7. The system of claim 1, wherein generating a plurality of game day sports contests by matching a plurality of pairs of user accounts from the set of game day user accounts comprises one or more of matching users based on stadium configuration, matching users based on lineup selections, and matching users based on user skill.

8. A computer implemented method for generating a plurality of game day sports contests, the method comprising a matching server generating a plurality of sports contests by:

receiving, via a communication network, game day event hosting indicators, game day lineup selections, game day equipment selections and game day stadium selections associated with respective user accounts from a plurality of user devices and defining a set of game day user accounts;

generating a plurality of game day sports contests by matching a plurality of pairs of user accounts from the set of game day user accounts;

generating and sending, via the communication network, game day matching notifications to user devices associated with the respective matched pairs of user accounts, and indicating a game day matching with a competitor user account including an indication of game day lineup selections associated with the competitor user account;

receiving, via the communication network, a game day ticket price selection from at least a portion of the user devices associated with the matched pairs of user accounts;

receiving final game day statistics, via the communication network, from a sports statistics server, including final statistics associated with real-life sporting events that occurred on the game day;

determining, for at least a portion of the matched pairs of user accounts, a winner and a loser of the game day sports contests associated with the matched pairs of user accounts, the determining based at least in part on the final statistics associated with real-life sporting events that occurred on the game day and lineup selections associated with the matched pairs of user accounts; and determining game day virtual stadium revenue associated with virtual stadiums of at least a portion of the matched pairs of user accounts, the determining based at least in part on a ticket price selection and lineup selections associated with a user account.

9. The system of claim 8, wherein the determining a winner and a loser of the game day sports contests associated with the matched pairs of user accounts is further based on stadium selections and equipment selections associated with the matched pairs of user accounts.

10. The system of claim 8, wherein the determining game day virtual stadium revenue is further based on stadium selections and a win/loss record of a user account.

11. The system of claim 8, wherein the matching server is further configured to modify a bank value associated with respective user accounts corresponding to determined game day virtual stadium revenue.

12. The system of claim 8, wherein the matching server is further configured to modify a bank value associated with respective user accounts corresponding to received lineup selections.

13. The system of claim 8, wherein generating a plurality of game day sports contests by matching a plurality of pairs of user accounts from the set of game day user accounts comprises one or more of matching users based on stadium configuration, matching users based on lineup selections, and matching users based on user skill.

14. A computer implemented method for generating a plurality of game day sports contests, the method comprising a matching server generating a plurality of contests by:

receiving game day lineup selections associated with respective user accounts from a plurality of user devices and defining a set of game day user accounts;

generating a plurality of game day sports contests by matching a plurality of pairs of user accounts from the set of game day user accounts;

sending game day matching notifications to user devices associated with the respective matched pairs of user accounts, and indicating a game day matching with a competitor user account including an indication of game day lineup selections associated with the competitor user account;

receiving a game day ticket price selection from at least a portion of the user devices associated with the matched pairs of user accounts;

receiving final game day statistics, including final statistics associated with real-life sporting events that occurred on the game day; and determining, for at least a portion of the matched pairs of user accounts, a winner and a loser of the game day sports contests associated with the matched pairs of user accounts, the determining based at least in part on the final statistics associated with real-life sporting events that occurred on the game day and lineup selections associated with the matched pairs of user accounts.

15. The method of claim 14, further comprising determining game day virtual stadium revenue associated with virtual stadiums of at least a portion of the matched pairs of user accounts, the determining based at least in part on a received ticket price selection and lineup selections associated with a user account.

16. The system of claim 15, wherein the determining game day virtual stadium revenue is further based on stadium selections and a win/loss record of a user account.

17. The system of claim 15, wherein the matching server is further configured to modify a bank value associated with respective user accounts corresponding to determined game day virtual stadium revenue.

18. The system of claim 14, wherein the determining a winner and a loser of the game day sports contests associated with the matched pairs of user accounts is further based on stadium selections and equipment selections associated with the matched pairs of user accounts.

19. The system of claim 14, wherein generating a plurality of game day sports contests by matching a plurality of pairs of user accounts from the set of game day user accounts comprises one or more of matching users based on stadium configuration, matching users based on lineup selections, and matching users based on user skill.

* * * * *